(12) United States Patent
Hosey

(10) Patent No.: US 7,151,664 B2
(45) Date of Patent: Dec. 19, 2006

(54) PORTABLE MEDIA DEVICE

(76) Inventor: Michael Hosey, 67 Farm View Rd., Fairview, NC (US) 28730

( * ) Notice: Subject to any disclaimer, the term of this patent is extended or adjusted under 35 U.S.C. 154(b) by 0 days.

(21) Appl. No.: 10/762,674

(22) Filed: Jan. 22, 2004

(65) Prior Publication Data

US 2005/0162823 A1    Jul. 28, 2005

(51) Int. Cl.
*G06F 1/16* (2006.01)
*H04N 5/225* (2006.01)

(52) U.S. Cl. .................. 361/684; 348/373; 428/142; 360/55

(58) Field of Classification Search ........ 361/679–687, 361/724–727; 348/373, 552; 428/142, 121; 360/55
See application file for complete search history.

(56) References Cited

U.S. PATENT DOCUMENTS

| | | | |
|---|---|---|---|
| 4,827,809 A * | 5/1989 | Broemel, Jr. ................. 81/57.3 |
| 6,836,212 B1 * | 12/2004 | Sawinski ................ 340/539.23 |
| 6,934,568 B1 * | 8/2005 | Charlier et al. ........... 455/575.3 |
| 2001/0027151 A1 * | 10/2001 | Siaperas ..................... 482/142 |
| 2004/0165302 A1 * | 8/2004 | Lu .............................. 360/55 |
| 2005/0024526 A1 * | 2/2005 | Wang ......................... 348/373 |
| 2005/0116042 A1 * | 6/2005 | Willkens ................. 235/462.44 |

* cited by examiner

*Primary Examiner*—Hung Van Duong
(74) *Attorney, Agent, or Firm*—Stuart Whittington

(57) ABSTRACT

A portable media device includes a memory, a data interface port communicatively coupled to the memory, and a portable housing encasing the memory and data interface port. The portable housing may include a locking retaining portion such as a carabineer clip or the like that locks the media device to a desired article. In certain example embodiments, the portable media device may be a digital camera, an MP3 player, a pocket flash memory or other similar digital devices.

19 Claims, 4 Drawing Sheets

PORTABLE MEDIA DEVICE

BACKGROUND OF THE INVENTION

1. Technical Field

The present invention relates to digital media devices and portable packaging therefore. More specifically, but not exclusively, the invention relates to digital devices residing in a housing that is convenient for transportation and which may provide secure attachment to a desired location.

2. Background Art

Conventionally, there are many types of digital medium devices such as digital cameras, digital camcorders, MP3 players, digital storage devices and the like, which are generally designed for portability. However, these devices typically require some interface to larger devices, such as PCs, laptops or printing devices, to download or upload digital information.

For example, for conventional digital cameras, a user may take pictures until the memory is filled and then download the digital image data to a PC for viewing and/or printing. The camera may interface to a PC or other host device using for example, a universal serial bus (USB), an infrared port, a serial port, a parallel port, SCSI or RF interface. Example digital video devices of the prior art are discussed in U.S. Pat. No. 6,628,325 to Steinberg et al.; U.S. Pat. No. 5,524,194 to Chida et al.; and U.S. Pat. No. 5,475,441, which are incorporated herein by reference.

Portable MP3 players may also interface with host devices in a similar manner as portable digital video devices but with the primary task of primarily downloading and managing music which is stored on the MP3 player. In an MP3 player, audio data is stored in a semiconductor memory, such as flash ROM, and the entire device may be formed in a relatively small compact housing. An example dual-mode MP3 player is described in U.S. Pat. No. 6,631,098 to Chang et al., which is incorporated herein by reference.

The inherent delicate and expensive nature of these electronic devices and their portable function conflict since during transport these items are susceptible to be broken, lost or otherwise adversely impacted. Accordingly, there is a need for packaging configurations which protect the portable digital devices as much as possible and prevent their loss without substantially being detrimental to their size and transportability. Further, there is a need to increase the portability of these devices.

BRIEF SUMMARY OF THE INVENTION

A portable media device is disclosed which includes a memory, a data interface port communicatively coupled to the memory, and a portable housing encasing the memory and data interface port. The portable housing unit preferably includes a locking retaining portion having at least two positions. In a first position the retaining portion facilitates insertion of an article for retaining the media device, and in a second position the retaining portion locks the media device to the article. In one embodiment, the retaining clip is configured as a carabineer clip.

In certain example embodiments, the portable media device may be a digital camera, an MP3 player, a pocket flash memory or other devices.

BRIEF DESCRIPTION OF THE SEVERAL VIEWS OF THE DRAWING

Further aspects, features and advantages of the present invention will become apparent from the following description of the invention in reference to the appended drawing in which like numerals denote like elements and in which.

DETAILED DESCRIPTION OF THE INVENTION

Figure 1A:
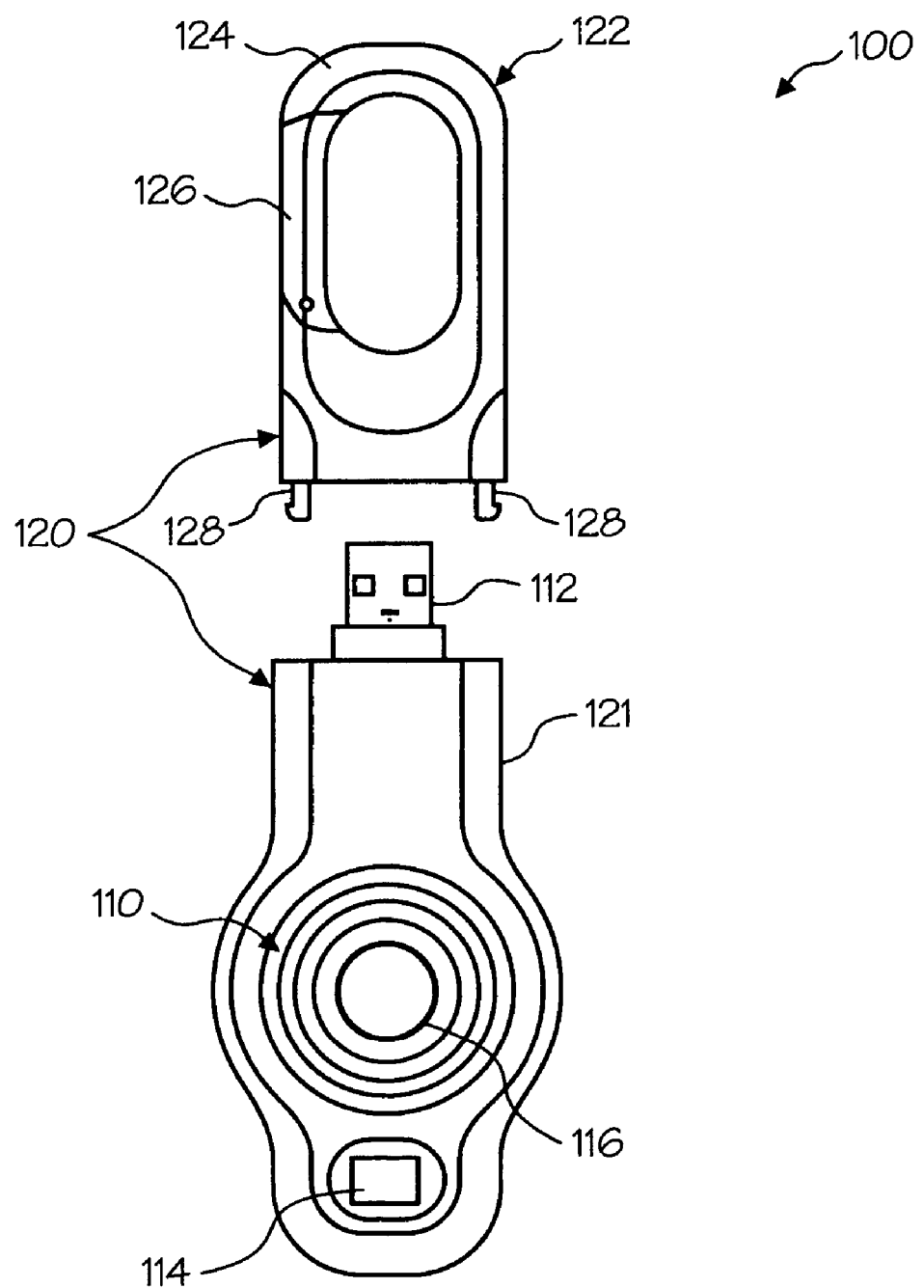
FIGS. 1A–1C show extended and non-extended top plan and side views of an apparatus according to one example embodiment of the present invention.
Figure 1B:
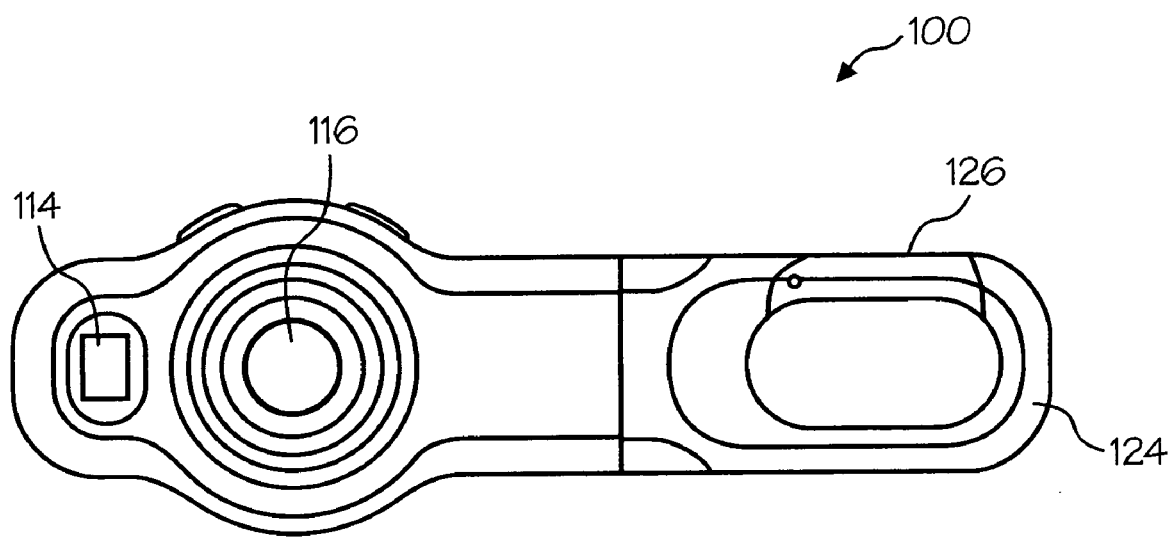
Figure 1C:
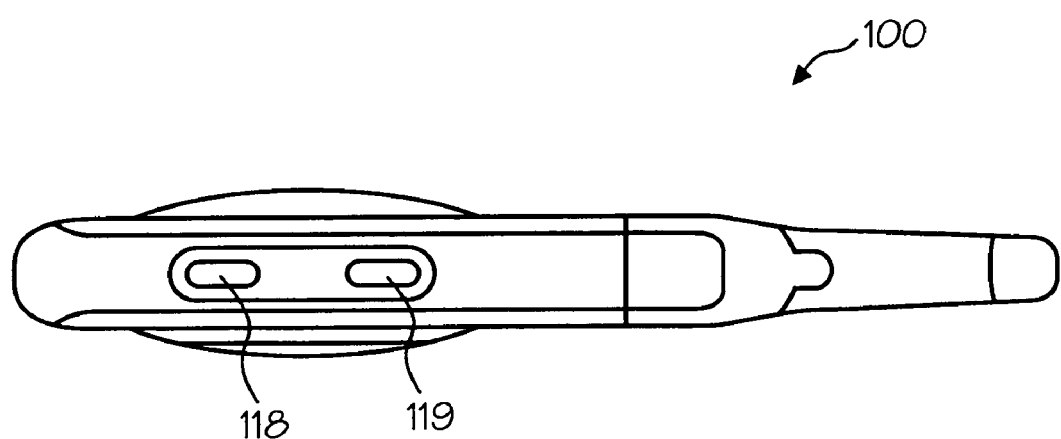

Turning to FIG. 1A–1C, a portable media device 100 according to various embodiments of the invention may include an electronic unit 110 and a unit housing 120.

Electronic unit 110 is configured to provide a user with data storage capabilities for storing one or more of audio, video and/or data files and potentially record, playback or otherwise manipulate data. Electronic unit 110 may be any single component or combination of components capable of storing digital information in a memory (e.g., RAM or ROM) resident on device 100 and/or a removable memory medium such as a flash memory card, memory-stick, SMARTMEDIA, or the like. In certain preferred embodiments, unit 110 may optionally include one or more information access ports 112 for facilitating transport of information to/from the device memory. Information access port 112 may be any type of existing or future arising data transfer port including but not limited to USB, Ethernet, Fire wire, SCSI, serial port, and/or parallel port.

In the example embodiment shown in FIGS. 1A–1C, electronic unit 110 is a digital camera including a viewfinder 114, a camera lens 116 one or more camera controls 118 and 119, camera circuit and/or processor (not shown) and a power source (not shown). Digital cameral 110 may also include an optional flash (not shown) if desired. Viewfinder 114 may be a simple transparent viewfinder and/or an electronic display such as a small LCD and accompanying circuitry. Camera lens 116 may be a static auto focus lens or may include an optical zoom (e.g., 3x) feature. In other embodiments, lens 116 may include a manual focus option. Camera controls 118, 119 provide a user the ability to adjust any camera settings and/or snap a picture. An LCD display (not shown) and/or status LED's may be optionally included to indicate camera settings and/or status. Features and configurations of digital cameras are known in the art (such as those described in the patents previously incorporated by reference) and thus the detailed operation and/or relevant circuitries are omitted for sake of clarity.

Housing 120 may be any structure configured to support and/or protect electronic unit 110 in a convenient, portable and secure manner. Housing 120 includes a locking retaining portion 122 to semi-permanently attach device 100 to an article of interest. As used herein, a "lock" or "locking" structure means a structure configured to temporarily fix unit 110 to an object in a manner that it cannot be inadvertently removed without: (i) permanently deforming the structure; or (ii) being manipulated by a user for removal.

Figure 2A:
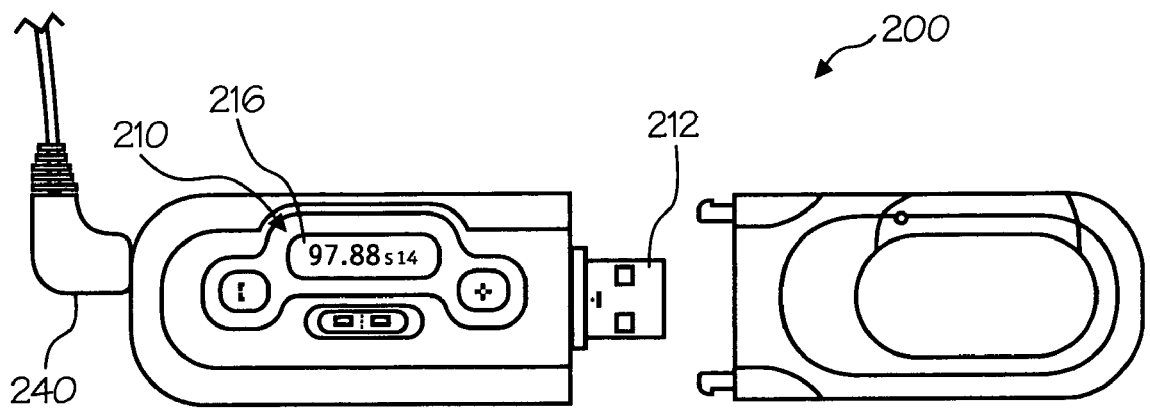
FIGS. 2A–2C show extended and non-extended top plan and side views of an apparatus according to another example embodiment of the present invention.
Figure 2B:
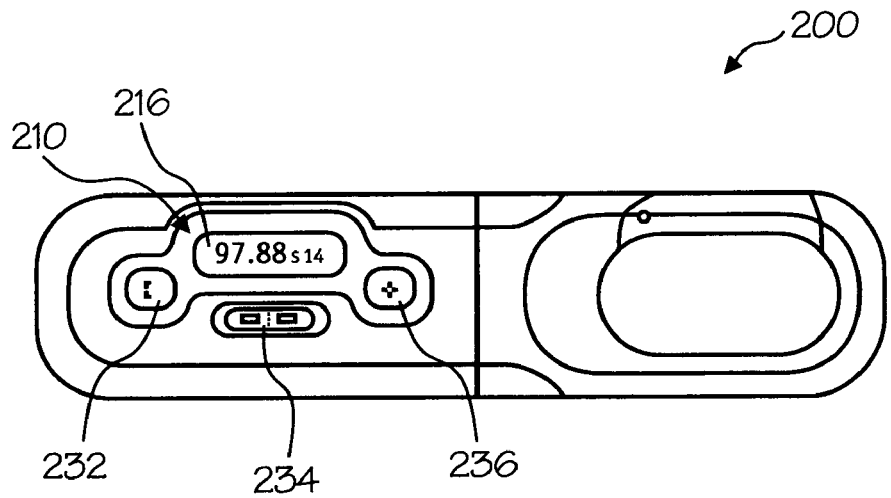
Figure 2C:
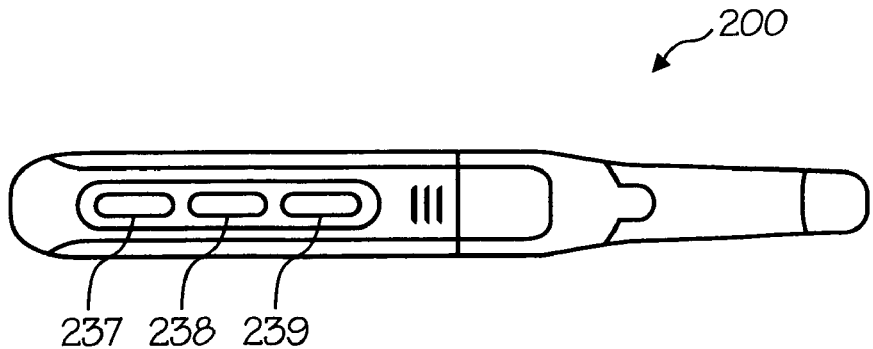
Figure 3:
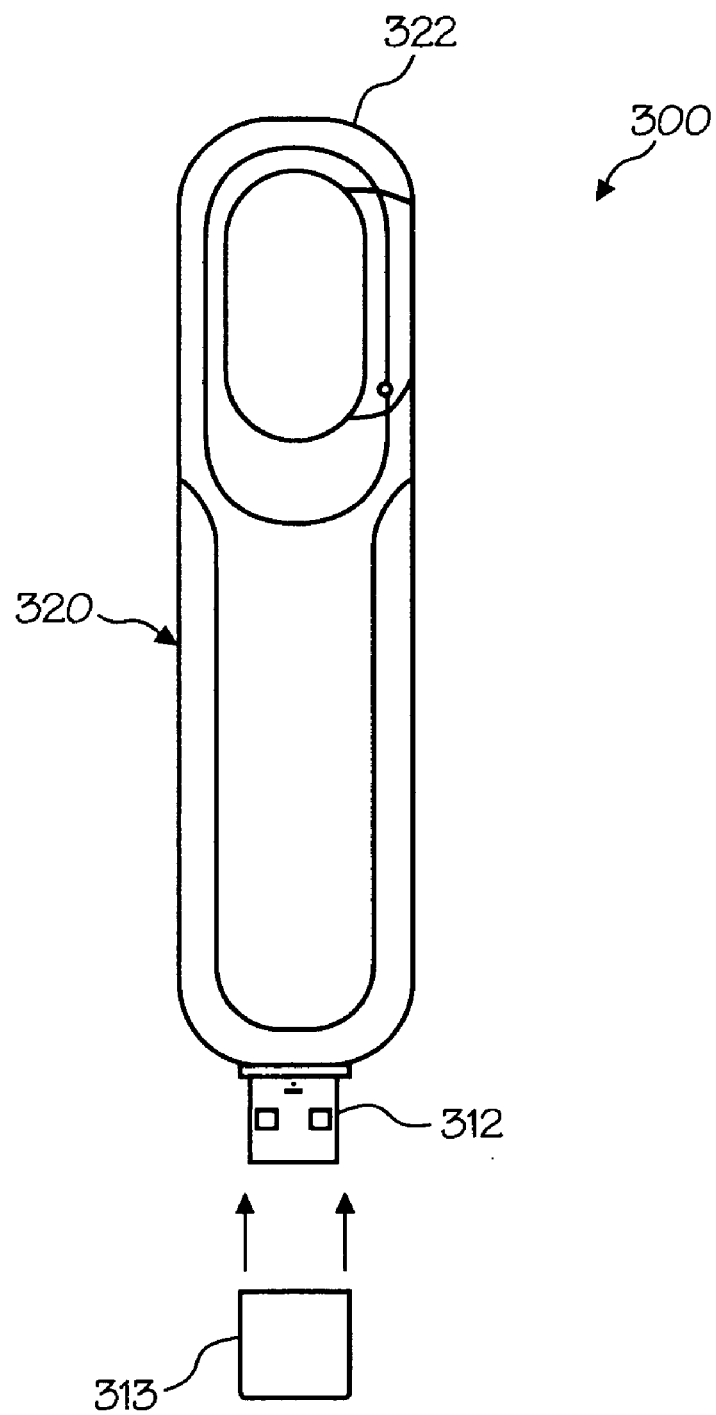
FIG. 3 shows a top plan view of an apparatus according to a third example embodiment of the present invention.

In the exemplary embodiments shown in FIGS. 1–3, the locking retaining portion 122 is configured as a carabineer clip including a partial ring-shaped portion 124 and a spring-biased pivot member 126. However, the invention is not limited to this specific type of clip configuration as there are many other types of locking structures which could also be used. For example, a C-clip with an axially moving spring-biased member and/or threaded coupling could also be used. Alternatively a retractable insert disposed in a partial ringed sleeve or other mechanically similar structure could be used. Numerous other locking closures or clasps could also be used. In any of these configurations, locking retaining portion 122 facilitates the semi-permanent attachment of device 100 to an object of interest without the possibility of accidental displacement once in a locked position.

Housing 120 may be made from any material which provides some rigid support for electronic unit 110. Examples of such materials include pressure molded plastics (e.g., PVC), cast metals (e.g., aluminum), carbon composites, rubber and the like.

Retaining clip 122 may be integral with housing 120 or attached to a base portion 121 of housing 120 via a pivot, hinge, ring, flexible band or other attachment, or combination thereof. In one embodiment, housing 120 is formed as a two-piece structure where retaining clip 122 is detachable from a base portion 121 via one or more connectors 128 and formed to serve as a cover for data port 112. Connectors 128 may be implemented using any type connecting members such as buckles, clasps, hooks, indentations and corresponding protrusions and the like.

Turning to FIGS. 2A–2C, another media device 200 according to other embodiments of the present invention, includes an electronic audio unit 210 encased in a housing 220. Housing 220 may be similar to that discussed in respect to the embodiments described in reference to FIG. 1.

In one embodiment, electronic audio unit 210 is an MP3 player and may include a data port 212 for loading and/or managing audio files. In other embodiments, data port 212 may be omitted, for example in the case of an AM/FM radio which may not require stored data. Data port 212 may also be substituted for a removable memory medium, e.g., SMARTMEDIA card, flash card memory-stick, optical mini-disk and the like. One or more data ports 212 and/or removable memories could also be used.

As shown in FIGS. 2A–2C, MP3 player 210 may include an LCD display 216 and appropriate player controls 232–239. Media device 200 may also include one or more audio output devices and/or ports 240 such as a speaker or headphone jack.

Turning to FIG. 3 a media device 300 is illustrated according to another embodiment of the invention. In this embodiment, device 300 is a pocket memory storage device such as a USB pocket flash memory. In preferred implementations, device 300 may include a housing 320 having a locking retaining portion 322 similar to that previously discussed, and a data port 312. As shown in FIG. 3, device 300 may be an integrated unit having retaining portion 322 on a side of housing 320 opposite data port 312. According to this embodiment, a separate data port cover 313 may be included to protect port 312 from damage and/or soiling. Additionally, a power source such as a battery may be omitted since the pocket memory device 300 may obtain power for reading/writing operations via a host machine (e.g., a P.C.) and no power is needed to maintain data in the memory.

The precise shape, materials, features and layout of any of the foregoing media devices is discretionary and can be selected as suitably desired without departing from the scope of the invention. Further, the embodiments of the invention are not limited to the specific electronic units described above as the housing with locking retaining portions can be adapted for supporting any transportable media device desired.

Unless contrary to physical possibility, the inventor envisions the components of respective embodiments combined in any manner.

Although there have been described preferred embodiments of this novel invention, many variations and modifications are possible and the embodiments described herein are not limited by the specific disclosure above, but rather should be limited only by the scope of the appended claims.

The invention claimed is:

1. A portable electronic device comprising:
   a memory;
   a data interface port communicatively coupled to the memory; and
   a portable housing unit integrated with and supporting the memory and data interface port, wherein at least a portion of the portable housing unit is formed as a locking retaining clip which in a first position facilitates insertion of a separate article for retaining the portable housing unit, and in a second position locks the portable housing unit to the article.

2. The device of claim 1 wherein the locking retaining clip comprises a carabineer clip.

3. The device of claim 1 wherein the portable electronic device comprises a digital camera.

4. The device of claim 1 wherein the portable electronic device comprises an audio device.

5. The device of claim 1 wherein the memory comprises a flash memory and wherein the data interface port comprises a universal serial bus (USB) interface.

6. The device of claim 1 wherein the portion of the portable housing unit forming the locking retaining clip is removable from a second portion of the housing unit integrated with the memory and data interface port.

7. The device of claim 4 wherein the audio device comprises an MP3 player.

8. The device of claim 6 wherein the portion of the portable housing unit forming the locking retaining clip is configured as a protective cover for the data interface port.

9. A portable media device comprising:
   an electronic unit; and
   a housing configured to house the electronic unit, wherein at least a portion of said housing is formed as a locking retaining clip comprising a moving member having a first position for attaching the media device to a separate article and a second position for locking the media device to the article.

10. The media device of claim 9 wherein the electronic unit comprises a digital video device.

11. The media device of claim 9 wherein the electronic unit comprises an audio device.

12. The media device of claim 9 wherein the electronic device comprises a flash memory.

13. The media device of claim 9 wherein the locking retaining portion comprises a carabineer clip.

14. The media device of claim 10 wherein the digital video device comprises a digital camera.

15. The media device of claim 11 wherein the audio device comprises an MP3 player.

16. A portable media device comprising:
- a portable housing at least a portion of which is formed as a carabineer clip configured to lock the media device to a separate article;
- a flash memory disposed in the housing;
- a USB port coupled to the memory; and
- a digital media device attached to said housing and coupled to the memory.

17. The device of claim 16 wherein the digital media device comprises one of a digital camera or an MP3 player.

18. The portable media device of claim 16 wherein the portion of the housing formed as a carabineer clip is detachable from a second portion of the housing.

19. The portable media device of claim 18 wherein the portion of the housing formed as a carabineer clip is configured as a protective cover for the USB port.

* * * * *